United States Patent
Grider et al.

(10) Patent No.: US 8,125,180 B2
(45) Date of Patent: Feb. 28, 2012

(54) INTEGRATED SIDE VIEW MIRROR ASSEMBLY AND ELECTRICAL PORT FOR AN AUTOMOTIVE VEHICLE

(75) Inventors: Duane M. Grider, Farmington Hills, MI (US); Bala Chander, Canton, MI (US); Dale Gilman, Beverly Hills, MI (US); David W. Schultz, Livonia, MI (US); Michael Kevin Martin, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 961 days.

(21) Appl. No.: 12/119,074

(22) Filed: May 12, 2008

(65) Prior Publication Data
US 2009/0278491 A1 Nov. 12, 2009

(51) Int. Cl.
H02J 7/14 (2006.01)

(52) U.S. Cl. .......................... 320/104; 320/107; 903/907

(58) Field of Classification Search .................. 320/104, 320/109, 107; 180/65.1; 903/907
See application file for complete search history.

(56) References Cited

U.S. PATENT DOCUMENTS

| 3,270,267 | A |   | 8/1966  | Nolte, Jr. |
| 3,673,379 | A |   | 6/1972  | Eversull |
| 5,012,070 | A |   | 4/1991  | Reed |
| 5,115,116 | A |   | 5/1992  | Reed |
| 5,251,588 | A |   | 10/1993 | Tsujii et al. |
| 5,281,792 | A |   | 1/1994  | Lee et al. |
| 5,344,331 | A |   | 9/1994  | Hoffman et al. |
| 5,457,378 | A | * | 10/1995 | Woody .......................... 320/108 |
| 5,757,595 | A | * | 5/1998  | Ozawa et al. ............... 340/636.1 |
| 6,157,162 | A | * | 12/2000 | Hayashi et al. ................ 320/104 |
| 6,232,577 | B1 |  | 5/2001  | Reiff |
| 6,253,866 | B1 |  | 7/2001  | Kojima |
| 6,351,098 | B1 |  | 2/2002  | Kaneko |
| 6,459,234 | B2 |  | 10/2002 | Kajiura |
| 2001/0013702 | A1 | | 8/2001  | Yanase et al. |
| 2005/0243449 | A1 | * | 11/2005 | Pavao ........................... 359/877 |
| 2006/0016793 | A1 | | 1/2006  | Zhu et al. |
| 2008/0203966 | A1 | * | 8/2008  | Ward ............................ 320/104 |

FOREIGN PATENT DOCUMENTS

| JP | 5256208    | 10/1993 |
| JP | 2001268715 | 9/2001  |
| JP | 2006238543 | 9/2006  |

* cited by examiner

Primary Examiner — Edward Tso
Assistant Examiner — Aaron Piggush
(74) Attorney, Agent, or Firm — David B. Kelley; Brooks Kushman P.C.

(57) ABSTRACT

An electrical port is integrated within a side view mirror assembly of an automotive vehicle. The electrical port is electrically connected with a charging system of the vehicle. The electrical port may be coupled with a power source remote from the vehicle to power the charging system. The electrical port may be concealed or exposed depending on a position of the side view mirror assembly.

13 Claims, 6 Drawing Sheets

INTEGRATED SIDE VIEW MIRROR ASSEMBLY AND ELECTRICAL PORT FOR AN AUTOMOTIVE VEHICLE

1. FIELD OF THE INVENTION

The invention relates to integrated side view mirror assemblies and electrical ports for automotive vehicles.

2. BACKGROUND ART

Various technologies may be used to charge a battery of an automotive vehicle. U.S. Pat. No. 5,344,331 to Hoffman et al. discloses an example of one charging technology. Hoffman et al. provides an electrical connector system for transmitting electrical energy especially designed for use with electric vehicles. The electrical connector system includes a male electrical connector or plug with a first set of electrical contacts arranged along a common arc and a female electrical connector or receptacle with a second set of electrical contacts arranged along a common arc. Both the receptacle and the plug have an apertured shutter for selectively covering and uncovering its respective electrical contacts to prevent inadvertent contact with the electrical contacts and to protect the electrical contacts from the environment. In the preferred embodiment, the shutters of the plug and receptacle are rotated to uncover the contacts only after full insertion of the plug into the receptacle. The plug can be inserted into the receptacle with little or no force by the user since the contacts are electrically coupled together by transversely moving the contacts of the receptacle through aligned openings in the shutters to engage the contact of the plug after full insertion of the plug into the receptacle. In another embodiment, the receptacle is provided with a break-away and manual release mechanism for automatically retracting the contacts of the receptacle from the contacts of the plug.

U.S. Pat. No. 6,351,098 to Kaneko discloses an example of another charging technology. Kaneko provides an electromagnetic induction type connection terminal for connecting a power supply station with a battery for charging the battery. The connection terminal has a charging paddle and a charging receptacle. The charging paddle has a primary coil that is supplied with a current from the power supply station. The charging receptacle has a secondary coil connected to the battery. When the primary coil is supplied with a current from the power supply station with the charging paddle plugged into the charging receptacle, an electromotive force is induced into the secondary coil. The charging receptacle has an enclosure for accommodating the secondary coil. The enclosure forms a shield against electromagnetic waves. The charging receptacle has a communication unit for communicating information with the charging paddle to control the charging. The communication unit is located within the enclosure.

U.S. Pat. No. 6,459,234 to Kajiura discloses an example of yet another charging technology. Kajiura provides a power supply paddle of a charger. The power supply paddle is provided at one end of a cable extending from a power source apparatus. A paddle holder casing which receives and holds therein the power supply paddle is obliquely provided on one side wall of a housing of the power source apparatus, so that an opening of the paddle holder casing is oriented slightly upwardly from the horizontal direction. The power supply paddle is received and held in the paddle holder casing when it is not being used.

SUMMARY

A charging system for an energy storage unit of an automotive vehicle includes an electrical port integrated with a side view mirror assembly. The electrical port is configured to receive electrical power from an electrical source remote from the vehicle and is electrically connected with the energy storage unit.

A side view mirror assembly for an automotive vehicle includes a base attached with the vehicle. A mirror housing extends from the base and an electrical port is configured to receive electrical power from an electrical source remote from the vehicle. The electrical port is electrically connected with the energy storage unit.

A method for charging an energy storage unit of an automotive vehicle includes moving a mirror housing from a first position to a second position to expose an electrical port and coupling a source of electrical power remote from the vehicle with the electrical port to provide electrical power to charge the energy storage unit.

DETAILED DESCRIPTION

Batteries of alternatively powered vehicles may be charged with power supplied from a residential outlet. To utilize such power, an electrical port, such as a plug, electrically connected with the batteries may be provided within an engine compartment or behind a door of a body panel of the vehicle. The port may be coupled with the outlet via, for example, an extension cord.

Accessing an electrical port located within an engine compartment may be inconvenient because a hood of the vehicle may have to be opened to gain access to the plug. Additionally, because some vehicles are provided in alternatively powered and conventional versions, providing a door for a body panel may require separate sets of tooling: one set for a body panel without a door for the conventional version and one set for the body panel with the door for the alternatively powered version. Separate sets of tooling may increase the complexity and cost associated with manufacturing the vehicle.

Embodiments of the invention provide an electrical port associated with a side view mirror assembly of a plug— in vehicle. The electrical port provides electrical access to a charging system for a vehicle battery. This arrangement may reduce complexity and cost because separate sets of body panel tooling are not necessary if producing alternatively powered and conventional versions of the vehicle. This arrangement may also reduce bending and/or stooping by a user when connecting or disconnecting an electrical source with the electrical port. Other benefits and advantages will be described below in more detail.

Figure 1:
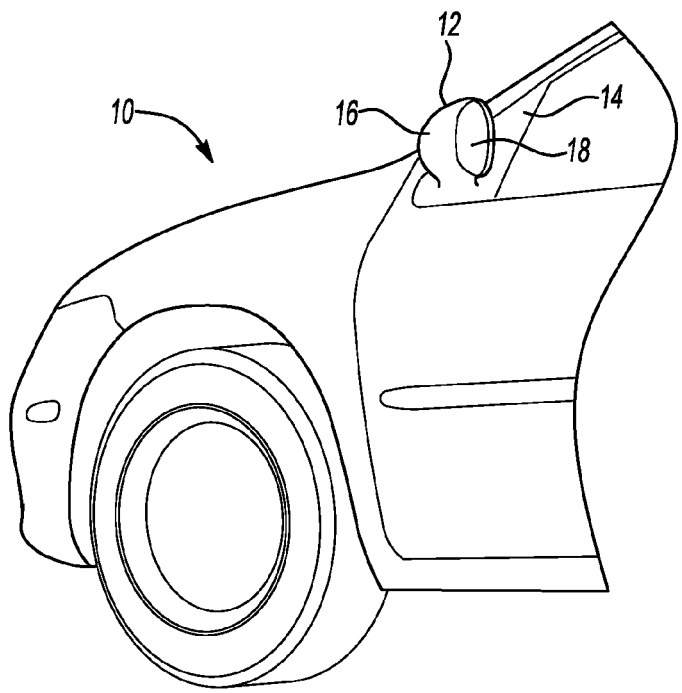
FIG. 1 is a driver's side perspective view of a portion of an alternatively powered vehicle.

Referring to FIG. 1, an alternatively powered vehicle 10 includes a side view mirror assembly 12. The side view mirror assembly 12 includes a base 14 attached with the vehicle 10, a mirror housing 16 extending from the base 14 and a side view mirror 18. The mirror housing 16 surrounds a rear portion of the side view mirror 18. The mirror housing 16 provides an aesthetically pleasing appearance for the side view mirror assembly 12 while protecting any mechanisms, such as gearing or motors, configured to move the side view mirror 18 relative to the mirror housing 16. As explained in more detail below, the side view mirror assembly 12 also includes an electrical port 28 (FIG. 2) that may be electrically connected with, for example, a residential electrical outlet.

Figure 2:
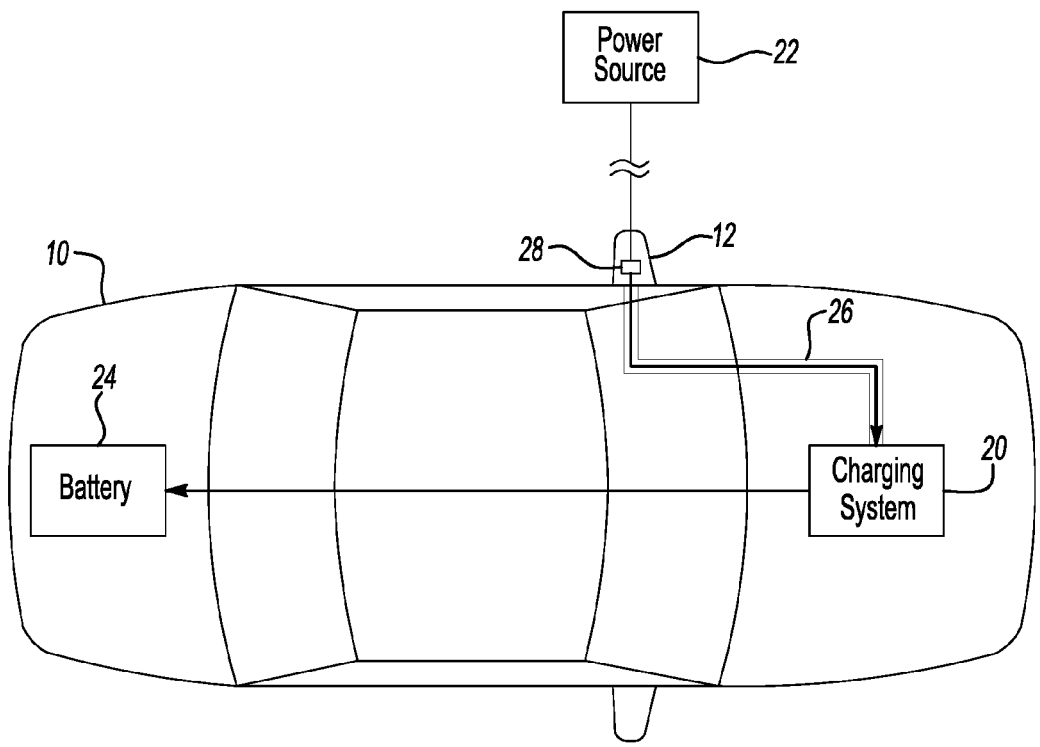
FIG. 2 is a plan view of the vehicle of FIG. 1.

Referring to FIG. 2, a charging system 20, e.g., power electronics, etc., provides electrical power (as indicated by arrow) from a power source 22, e.g., a residential power outlet, electrically connected with the electrical port 28 to a high voltage battery 24. Power stored by the high voltage battery 24 may then be used to move the vehicle 10.

Electromagnetic shielding 26 surrounds the electrical connection between the electrical port 28 and the charging system 20. In the example of FIG. 2, the electromagnetic shielding 26 may be a braided, foil or other type of electromagnetic shield material that is integral to the wire and capable of enclosing part or all of the length of the electrical power or electrical signal conductors in the wire. In other examples, the electromagnetic shielding 26 may take the form of any suitable material and geometry that provides electromagnetic shielding. The electromagnetic shielding 26 reduces or eliminates unwanted electromagnetic noise radiated from the electrical power or electrical signal lines in the wire cable to adjacent components. It also reduces or eliminates unwanted externally generated electromagnetic noise from being transferred to the electrical power or electrical signal lines in the wire cable.

In the example of FIG. 2, the vehicle 10 is a plug-in electric vehicle. That is, the high voltage battery 24 used to store energy to move the vehicle 10 is recharged by "plugging-in" the vehicle 10 to, for example, a residential electrical outlet. In other examples, the vehicle 10 may be a plug-in hybrid electric vehicle. Other configurations are also possible.

Figure 3:
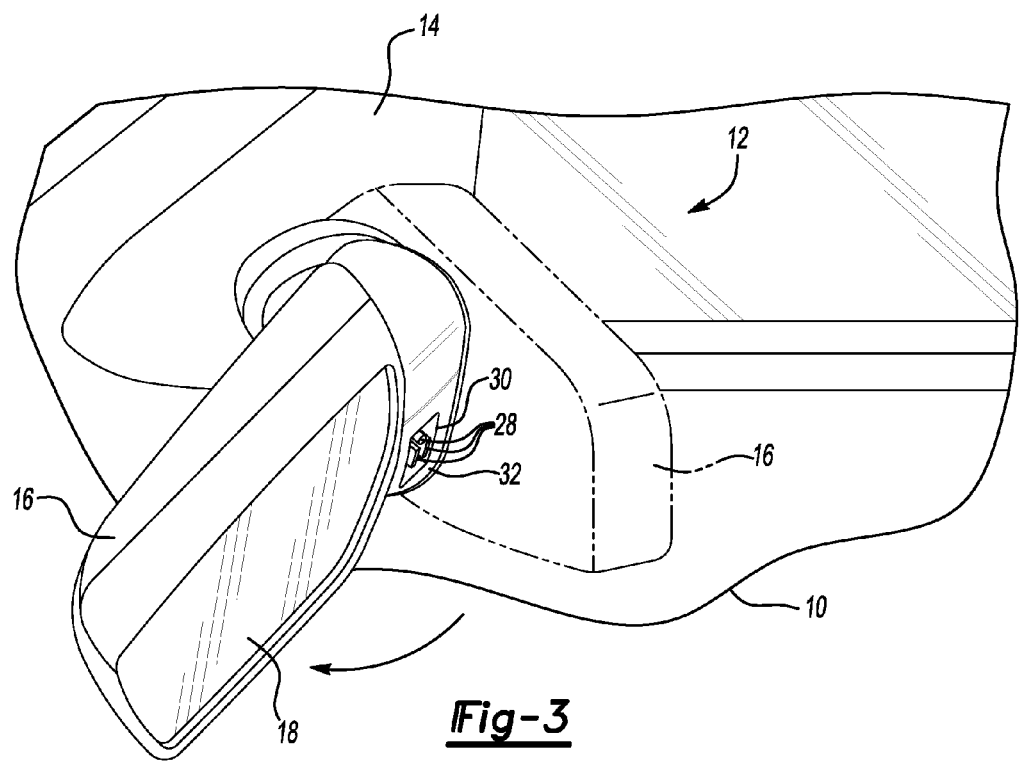
FIG. 3 is a driver's side perspective view of the side view mirror assembly of FIG. 1 according to certain embodiments of the invention.

Referring to FIG. 3, the mirror housing 16 and mirror 18 have been rotated (as indicated by arrow) from the position shown in phantom line toward the front of the vehicle 10 to expose the electrical port 28 integrated within a recess 30 of an arm portion 32 of the base 14. In other examples, the electrical port 28 may be integrated within any suitable portion of the side view mirror assembly 12. When the mirror housing 16 and mirror 18 are in the position shown in phantom line, the electrical port 28 is hidden by the mirror housing 16. The electrical port 28 is thus protected from environmental debris when the mirror housing 16 and mirror 18 are in the position shown in phantom line. When the mirror housing 16 and mirror 18 are in the position shown in solid line, the electrical port 28 is accessible and may be electrically connected with a power source. As an example, an extension cord may be plugged into a residential power outlet and the electrical port 28 to charge the battery 24.

The mirror housing 16 rests atop the arm portion 32. A pivot mechanism (not shown) connected with the mirror housing 16 and arm portion 32 permits the mirror housing 16 to move between the positions shown in FIG. 3. In other examples gearing, linkages or any other suitable connection may be used to permit the mirror housing 16 to move between the positions shown in FIG. 3.

In the example of FIG. 3, the electrical port 28 is an electrical plug that includes three blades. The blades are configured to receive an electrical socket (not shown) similar to those found on household extension cords. In other examples, the electrical port 28 may be an electrical socket or any other suitable electrical connector.

Figure 4A:
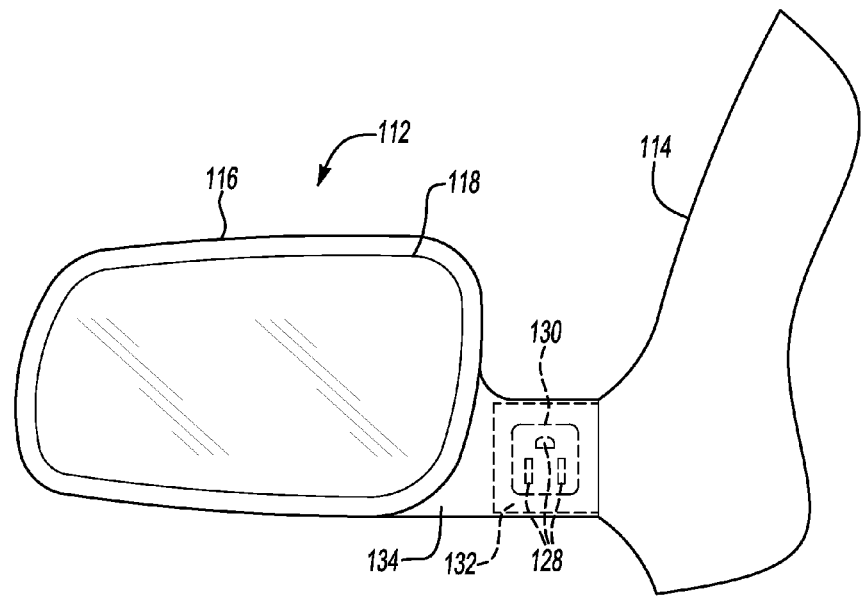
FIG. 4A is a rear view of another side view mirror assembly according to certain embodiments of the invention.

Referring to FIG. 4A, an electrical port 128 is integrated within a recess 130 of an arm portion 132 of a base 114 of a side view mirror assembly 112. Numbered elements of FIG. 4A that differ by 100 relative to numbered elements of FIGS. 1-3 have similar, although not necessarily identical, descriptions to the numbered elements of FIGS. 1-3. In the position shown in FIG. 4A, the electrical port 128 is hidden by a sleeve portion 134 of the mirror housing 116 and thus protected from environmental debris.

Figure 4B:
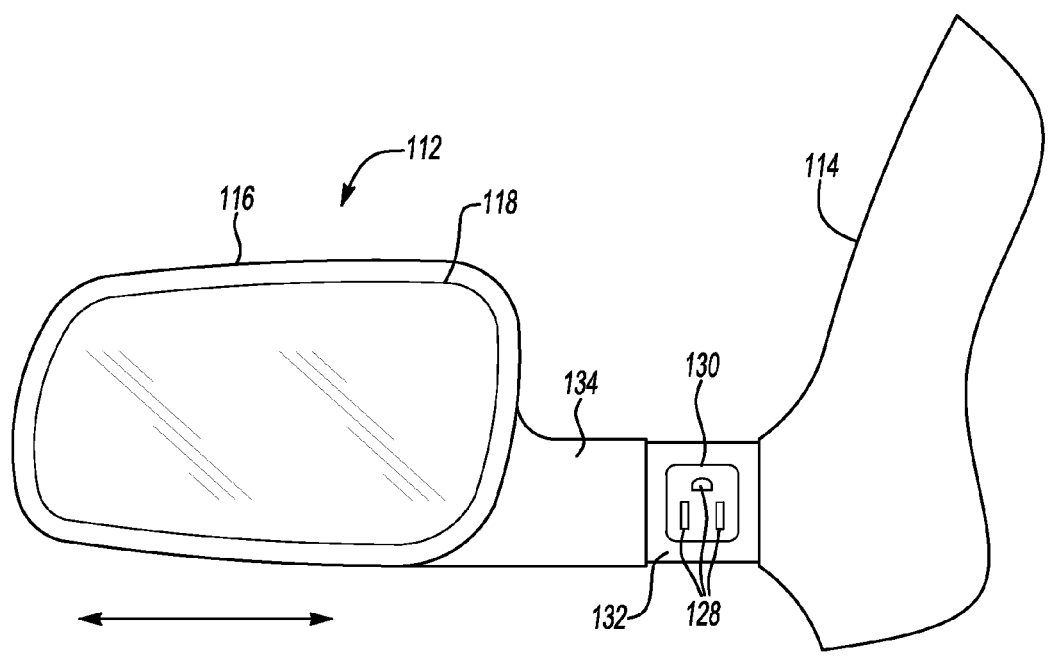
FIG. 4B is another rear view of the side view mirror assembly of FIG. 4A.

Referring to FIG. 4B, a mirror housing 116 and mirror 118 have been slid (as indicated by arrow) from the position shown in FIG. 4A away from the vehicle 110 (not shown) to expose the electrical port 128.

The sleeve portion 134 has a slip fit relationship with the arm portion 132. Any suitable locking or latching mechanism (not shown) may be used to fix the mirror housing 116 in the positions illustrated in FIGS. 4A-4B. As an example, the sleeve portion 134 may include a thumb-actuated latch (not shown) that engages notches (not shown) in the arm portion 132. To move the mirror housing 116 from the position shown in FIG. 4A to that shown in FIG. 4B, a user may pull back on the latch releasing its engagement with one of the notches. The mirror housing 116 may then be slid to the position shown in FIG. 4B where the latch again engages another of the notches. To move the mirror housing 116 from the position shown in FIG. 4B to that shown in FIG. 4A, the above procedure is reversed. Other techniques and mechanisms are also possible.

Figure 5A:
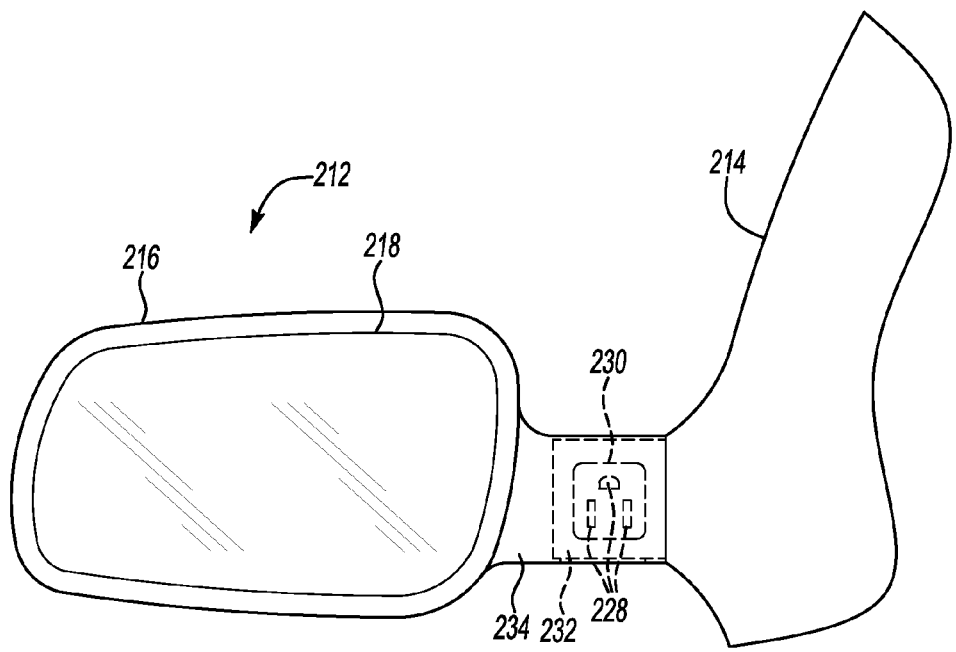
FIG. 5A is a rear view of yet another side view mirror assembly according to certain embodiments of the invention.

Referring to FIG. 5A, an electrical port 228 is integrated within a recess 230 of an arm portion 232 of a base 214 of a side view mirror assembly 212. Numbered elements of FIG. 5A that differ by 200 relative to numbered elements of FIGS. 1-3 have similar, although not necessarily identical, descriptions to the numbered elements of FIGS. 1-3. In the position shown in FIG. 5A, the electrical port 128 is hidden by a sleeve portion 234 of the mirror housing 216 and thus protected from environmental debris.

Figure 5B:
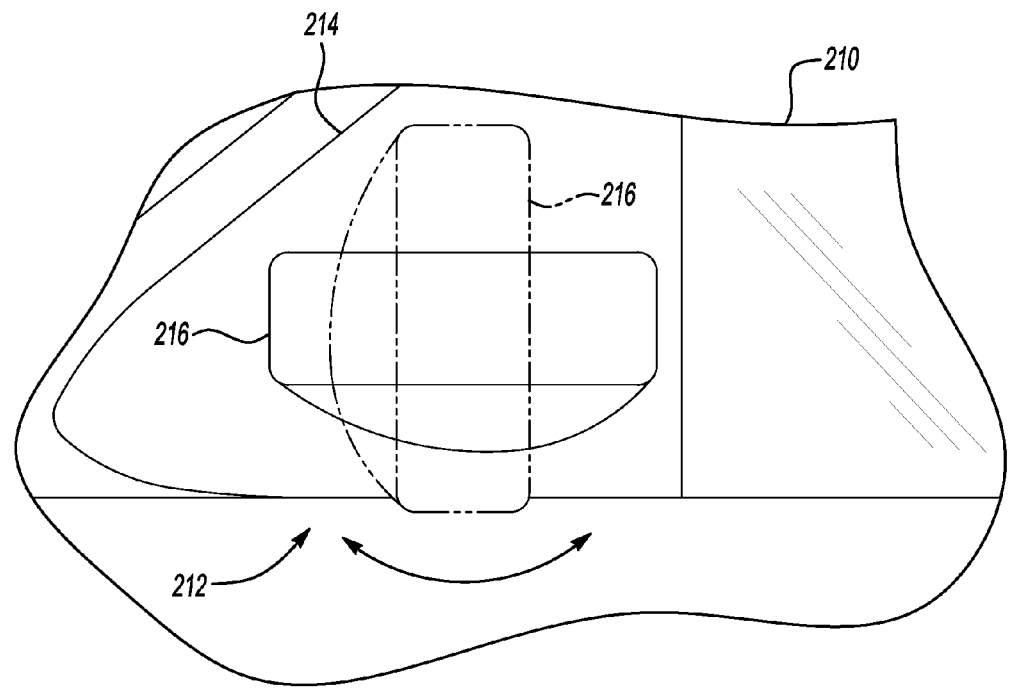
FIG. 5B is side view of the side view mirror assembly of FIG. 5A.

Referring to FIG. 5B, the mirror housing 216 has been rotated (as indicated by arrow) approximately 90° from the position shown in phantom line to the position shown in solid line.

Any suitable locking or latching mechanism (not shown) may be used to fix the mirror housing 216 in the positions shown in phantom line and solid line. As an example, the arm portion 232 (FIG. 5A) may include a spring-loaded button (not shown). The sleeve portion 234 (FIG. 5A) may include two openings (not shown) to receive the button. To move the mirror housing 216 from the position shown in phantom line to that shown in solid line, a user may press the button releasing its engagement with one of the openings. The mirror housing 216 may then be rotated to the position shown in solid line where the button again engages the other of the openings. To move the mirror housing 216 from the position shown in solid line to that shown in phantom line, the above procedure is reversed. Other techniques and mechanisms are also possible.

Figure 5C:
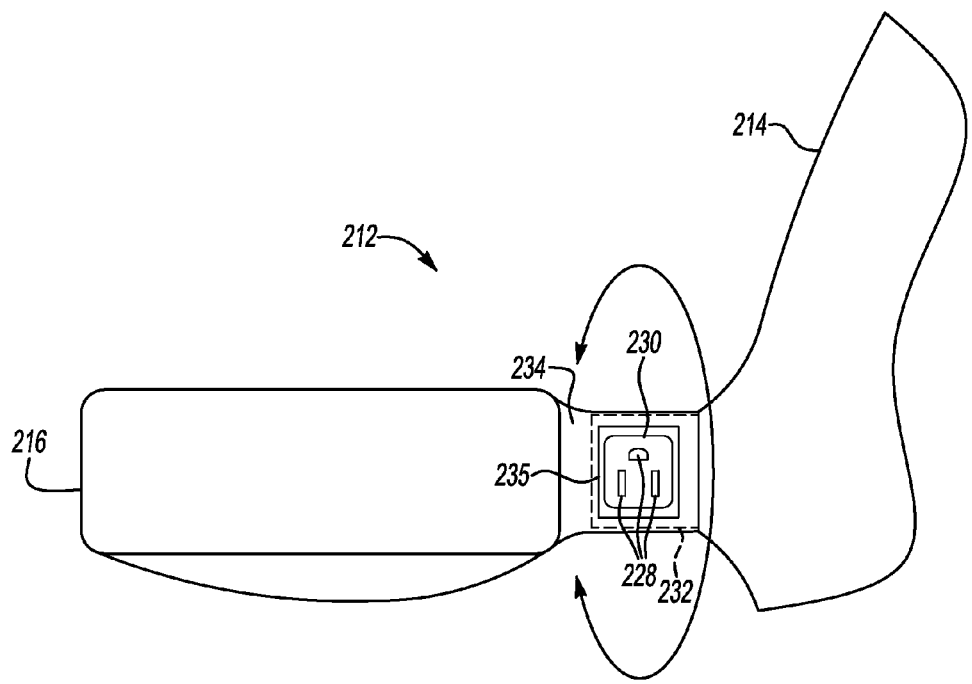
FIG. 5C is another rear view of the side view mirror assembly of FIG. 5A.

Referring to FIG. 5C, an opening 235 within the bottom of the sleeve portion 234 is in registration with the recess 230. The electrical port 228 is thus accessible.

Figure 6:
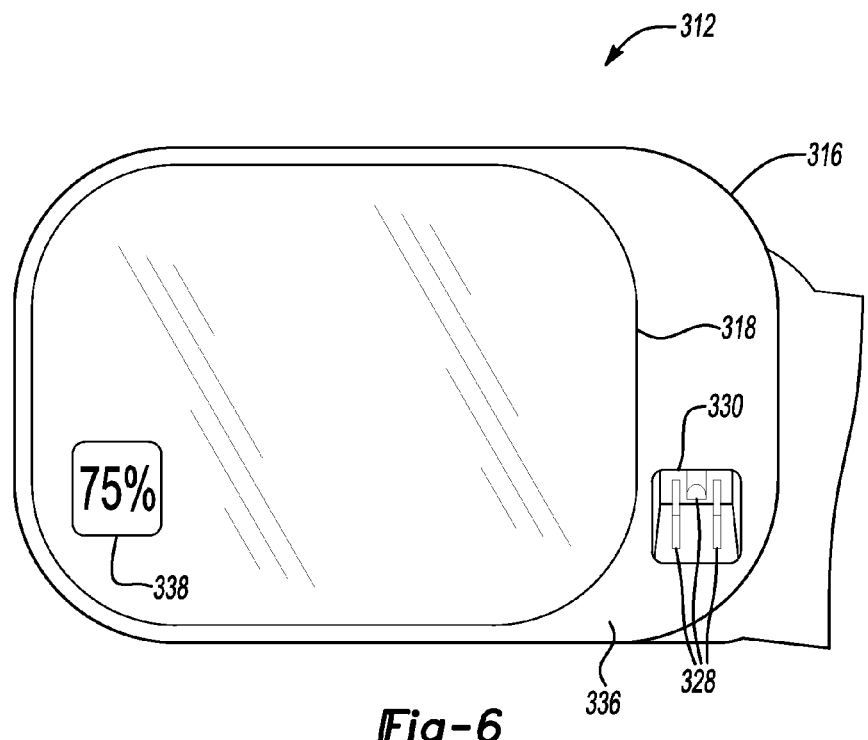
FIG. 6 is a rear view of still yet another side view mirror assembly according to certain embodiments of the invention.

Referring to FIG. 6, an electrical port 328 is integrated within a recess 330 of a face portion 336 of a mirror housing 316 of a side view mirror assembly 312. Numbered elements of FIG. 6 that differ by 300 relative to numbered elements of FIGS. 1-3 have similar, although not necessarily identical, descriptions to the numbered elements of FIGS. 1-3. In other examples, the electrical port 328 may protrude from the face portion 336 or any other suitable portion of the side view mirror assembly 312. That is, the electrical port 328 may not reside within a recess formed in the side view mirror assembly 312.

A mirror 318 includes a display 338 that displays information about the vehicle (not shown) and the electrical power used to charge a battery (not shown). As illustrated, the display 338 indicates the current state of charge of the battery. In the example of FIG. 6, the display 338 includes a plurality of light emitting diodes (LEDs) that may be activated to convey information to a driver. In other examples, any suitable display technology may be used. The display 338 may also indicate that the vehicle is connected/disconnected with a charging power source, the time required to charge the battery and/or the time remaining until the battery is fully charged. Other suitable information may also be displayed. Because the display 338 is located within the mirror 318, it is visible from the interior or exterior of the vehicle 310. Other locations are also possible.

Figure 7:
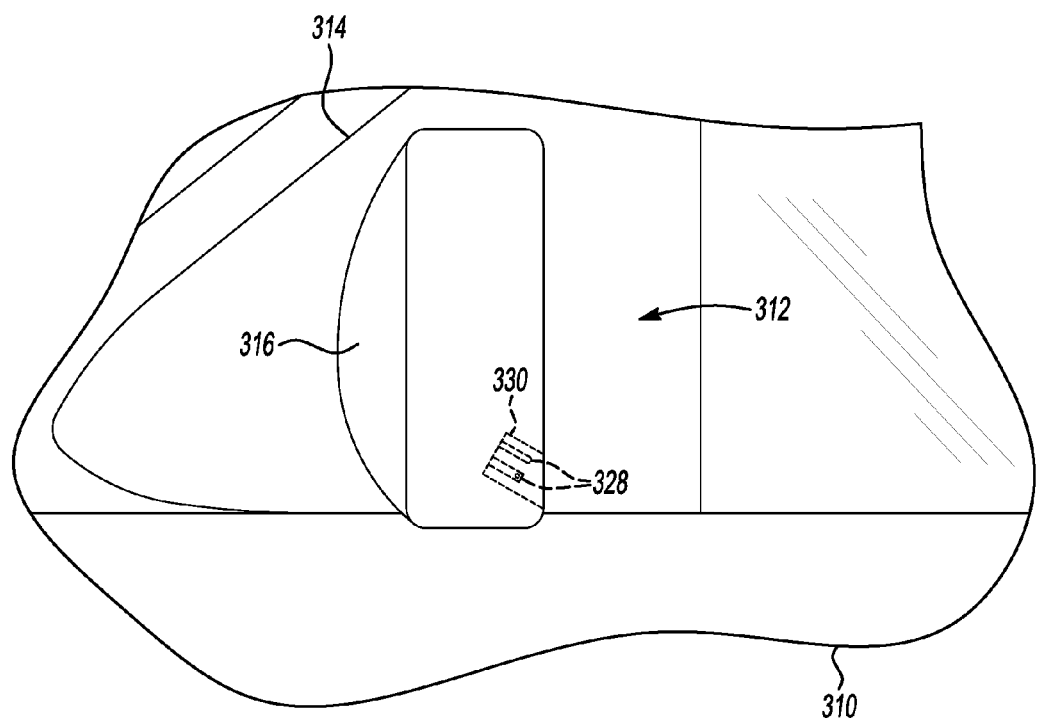
FIG. 7 is a side view of the side view mirror assembly of FIG. 6.

Referring to FIG. 7, the recess 330 and blades of the electrical port 328 are oriented approximately 40° down from horizontal. This orientation reduces the amount of debris and moisture accumulated in the recess 330 and on the blades of the electrical port 328. As an example, gravity will act to draw particulate matter and water droplets out from the recess 330. As another example, mud thrown up from the front tires (not shown) while driving is less likely to lodge within the recess 330 as the opening to the recess 330 faces away from the front tires. In other examples, the electrical port 328 may have a different orientation. As an example, the electrical port 328 may be located on the bottom of the side view mirror assembly 312 and thus face the road.

Figure 8:
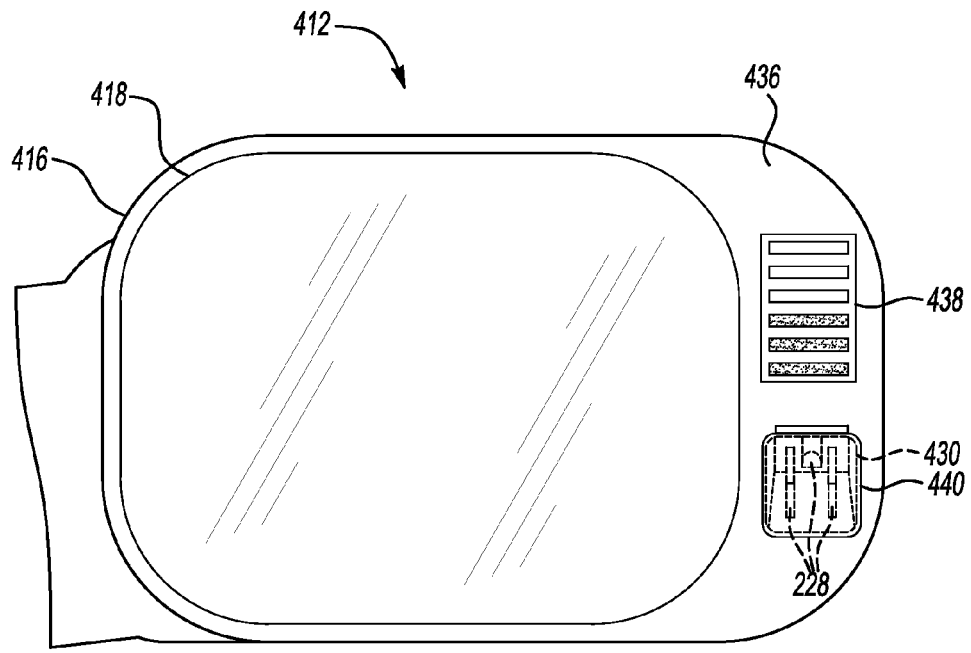
FIG. 8 is a rear view of still yet another side view mirror assembly according to certain embodiments of the invention.

Referring to FIG. 8, a hinged plate 440 covers an electrical port 428 integrated within a recess 430 of a face portion 436 of a mirror housing 416 of a side view mirror assembly 412. Numbered elements of FIG. 8 that differ by 400 relative to numbered elements of FIGS. 1-3 have similar, although not necessarily identical, descriptions to the numbered elements of FIGS. 1-3. Numbered elements of FIG. 8 that differ by 100 relative to numbered elements of FIGS. 6-7 have similar, although not necessarily identical, descriptions to the numbered elements of FIGS. 6-7. To expose the electrical port 428, the hinged plate 440 is flipped up. To conceal the electrical port 428, the hinged plate 440 is flipped down. Other arrangements are also possible. As an example, a sliding panel (not shown) may be used to cover the electrical port 428. To expose the electrical port 428, the sliding panel would be slid in one direction. To conceal the electrical port 428, the sliding panel would be slid in the opposite direction.

Figure 9:
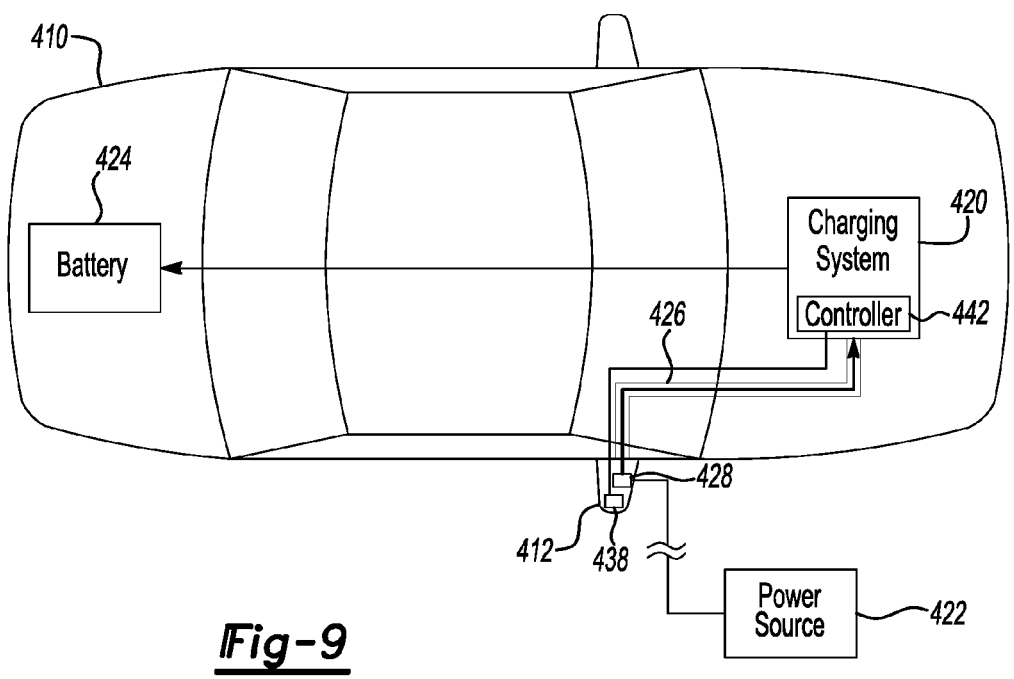
FIG. 9 is a plan view of an alternatively powered vehicle including the side view mirror assembly of FIG. 8.

Referring to FIG. 9, a controller 442 electrically connected with the electrical port 428 and a display 438, may detect information about the vehicle 410 and a condition of the power received from the power source 422. As an example, the controller 442 may detect the presence of a charging plug by use of a switch or sensor located in the side view mirror assembly 412. As another example, the controller 442 may receive an electrical signal indicating the presence of a charging plug from another electrical module or signal source on board the vehicle 410. As still yet another example, the controller 442 may detect the voltage and current provided to the charging system 420 from the power source 422. In other examples, the controller 442 may detect information about the vehicle 410 by accessing a communication network of the vehicle 410.

The controller 442 may command the display 438 (FIG. 8) to display information detected by the controller 442. As an example, the controller 442 may command the display 438 to display a certain pattern indicating that a charging plug is coupled with the electrical port 428. As another example, the controller 442 may command the display 438 to display a certain pattern indicating that the power factor of the charging power is within a desired range. In other examples, the controller 442 may command the display to display any suitable information.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A charging system for an energy storage unit of an automotive vehicle comprising:
    a side view mirror assembly including a base attached with the vehicle and a mirror housing extending from the base and moveable between first and second positions; and
    an electrical port integrated with the assembly, electrically connected with the energy storage unit, and configured to receive power from an electrical source remote from the vehicle, the electrical port being concealed if the housing is in the first position and exposed if the housing is in the second position.

2. The system of claim 1 wherein the side view mirror assembly includes an indicator feature to provide information about at least one of the vehicle and the power.

3. The system of claim 2 wherein the indicator feature comprises a visual indicator feature.

4. The system of claim 3 wherein the visual indicator feature is visible from at least one of an interior of the vehicle and an exterior of the vehicle.

5. The system of claim 2 wherein the charging system further includes a controller being configured to at least one of detect a state of the vehicle and a condition of the received power and to provide a control signal based on the at least one detected state and condition to the indicator feature.

6. The system of claim 1 wherein the mirror housing is rotatable relative to the base between the first and second positions.

7. The system of claim 1 wherein the mirror housing is slidable relative to the base between the first and second positions.

8. The system of claim 1 wherein the electrical connection between the electrical port and the energy storage unit includes electromagnetic shielding.

9. A side view mirror assembly for an automotive vehicle including an energy storage unit, the assembly comprising:
    a base attached with the vehicle;
    a mirror housing extending from the base and moveable between first and second positions; and
    an electrical port configured to receive power from an electrical source remote from the vehicle and electrically connected with the energy storage unit, the electrical port being concealed if the housing is in the first position and being exposed if the housing is in the second position.

10. The assembly of claim 9 wherein the mirror housing is rotatable relative to the base between the first and second positions.

11. The assembly of claim 9 wherein the mirror housing is slidable relative to the base between the first and second positions.

12. The assembly of claim 9 further comprising an indicator feature to provide information about at least one of the vehicle and the power.

13. A vehicle comprising:
a battery;
a side view mirror assembly including a base and a mirror housing extending from the base and moveable between first and second positions; and
an electrical port electrically connected with the battery and configured to receive power from an electrical source remote from the vehicle, the electrical port being concealed if the housing is in the first position and being exposed if the housing is in the second position.

\* \* \* \* \*